April 13, 1965   J. H. MORSE   3,178,657
OPTICAL MASER SYSTEM FOR PRODUCTION OF REPETITIVE
SHORT PULSES OF COHERENT LIGHT
Filed April 11, 1962   2 Sheets-Sheet 1

INVENTOR.
JAMES H. MORSE,
BY John M. Koch

ATTORNEY.

April 13, 1965 J. H. MORSE 3,178,657
OPTICAL MASER SYSTEM FOR PRODUCTION OF REPETITIVE
SHORT PULSES OF COHERENT LIGHT
Filed April 11, 1962 2 Sheets-Sheet 2

INVENTOR.
JAMES H. MORSE,
BY John M. Koch
ATTORNEY.

United States Patent Office 3,178,657
Patented Apr. 13, 1965

3,178,657
OPTICAL MASER SYSTEM FOR PRODUCTION OF REPETITIVE SHORT PULSES OF COHERENT LIGHT
James H. Morse, Malibu, Calif., assignor to Hughes Aircraft Company, Culver City, Calif., a corporation of Delaware
Filed Apr. 11, 1962, Ser. No. 186,718
3 Claims. (Cl. 331—94.5)

This invention relates to the operation of an optical maser system, and particularly to a system designed for the production of pulses of emitted light.

The production of controlled short pulses of light, such as are required in signaling, range finding, etc., has been performed by the use of a laser material rod and two pumping means, such as two flash tubes. One of the flash tubes is adapted to excite the laser material rod to the threshold of emission of coherent light. The other flash tube is adapted to supply additional excitation to the laser material rod sufficient to produce stimulated emission of light. This apparatus is somewhat cumbersome and occupies more space than is desirable in airborne systems. Also, the use of two flash tubes, or sharing one flash tube with two modulators, or other means of producing different time varying pulse shapes, together with auxiliary firing circuitry and other equipment results in more weight than is desirable for airborne systems.

Accordingly, it is an important object of this invention to provide a light-weight, compact optical maser system for the production of repetitive short pulses of emitted light energy.

Additional objects will become apparent from the following description, which is given primarily for purposes of illustration and not limitation.

Briefly, stated in general terms the objects of this invention are attained by providing an optical maser system including a pulse generator or modulator, a flash tube cooperatively associated with the modulator for the production of pumping light in predetermined timed pulses, and a body of laser material cooperatively associated with the flash tube for being correspondingly excited by the timed pumping pulses of light produced by the flash tube. This system is operated by applying pumping energy in controlled timed pulses to the light pump or flash tube so that the pulses are spaced by time intervals which are substantially less than the fluorescent relaxation time for the maser material. The pulses of applied pumping energy are applied to the light pump repetitively until the maser material is pumped to the excitation level for stimulated emission of coherent light. The resulting pulses of emitted light are employed in connection with suitable auxiliary equipment for range finding, communication, or other similar applications.

A more detailed description of a preferred embodiment of the invention is given below, with reference to the accompanying drawing, wherein.

Figure 1:
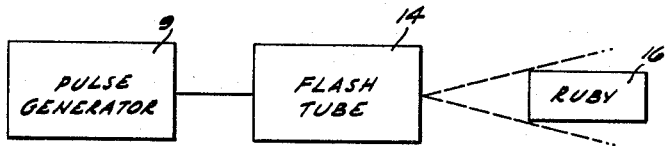
FIG. 1 is a block diagram showing a system for the production of repetitive pulses of coherent light.
Figure 2:
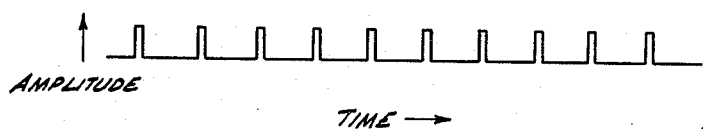
FIG. 2 is a schematic representation of a train of pulses generated by the pulse generator of FIG. 1.
Figure 6:
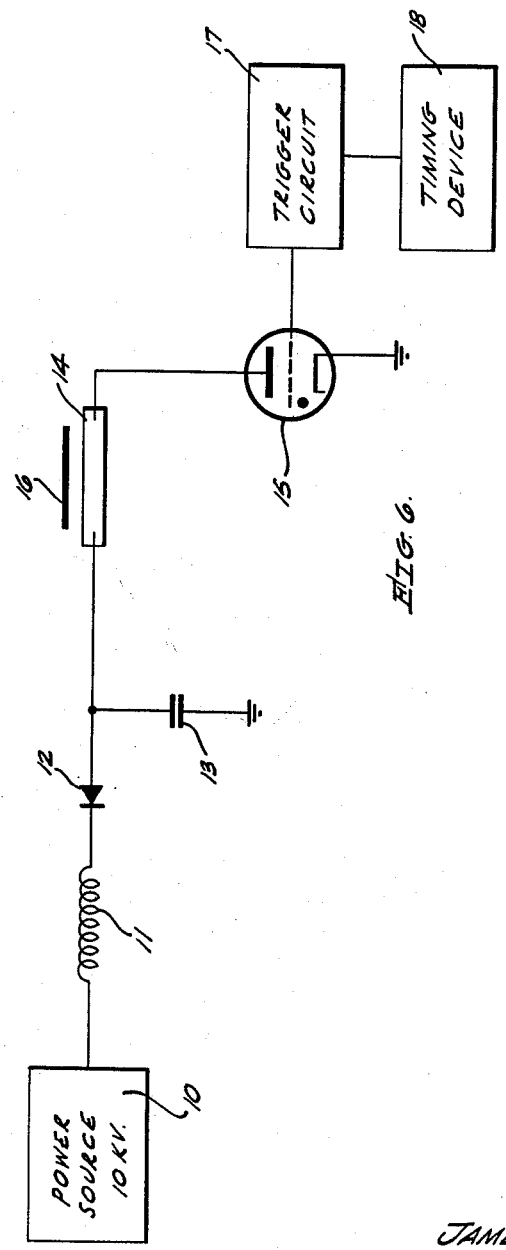
FIG. 6 is a circuit diagram showing a pulse modulator or pulse generator suitable for use in the system shown in FIG. 1.

The pulse generator or modulator 9 shown in FIG. 1 can be of any suitable design. A suitable pulse modulator is shown in FIG. 6. It includes a power source 10 of 10 kilovolts which will deliver the required current for the modulator. The power source 10 is connected to a resonance charging choke 11, which serves the function of doubling the voltage to 20 kilovolts. Charging choke 11 is connected in series to a diode 12, which serves the function of preventing the voltage from discharging through the power source 10. The diode 12, in turn, is connected to a grounded capacitor 13 which serves the purpose of storing electrical energy for the individual pulses. Diode 12 also is connected to a flash tube 14. Flash tube 14 excites maser material 16 to the threshold for stimulated emission and is grounded through a thyratron tube 15, which serves the purpose of a switch. Thyratron tube 15 is connected to a trigger circuit 17, which triggers the thyratron tube and the trigger circuit is connected to a timing device 18.

The operation of the pulse modulator or generator 9 of FIG. 6 to excite a pink ruby 16, for example, to the threshold for the production of stimulated emission is as follows. The pulse generator 9 is made to pulse in a cyclic manner with a time interval between pulses which is substantially less than the fluorescent relaxation time for the pink ruby 16. After a finite number of pulses, the number depending upon the pulse energy, the interval between pulses, and the maser material relaxation time; the pink ruby 16 is brought to the level of stimulated emission. Stimulated emission then occurs for each succeeding excitation pulse. In one actual operation with a pink ruby crystal, stimulated emission commenced at the seventh, and succeeding pulses. No stimulated emission pulses were produced by the pink ruby crystal during the first six light pumping pulses. It took six pumping pulses to elevate the pink ruby crystal to the threshold for stimulated emission.

Figure 3:
FIG. 3 is a similar schematic representation showing a train of pulses produced by the flash tube of FIG. 1.
Figure 4:
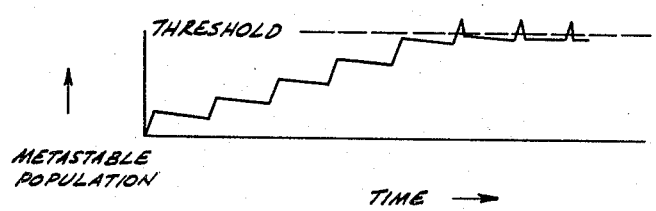
FIG. 4 is a similar schematic representation showing the stepwise elevation of the quantum state of the maser material of FIG. 1.
Figure 5:
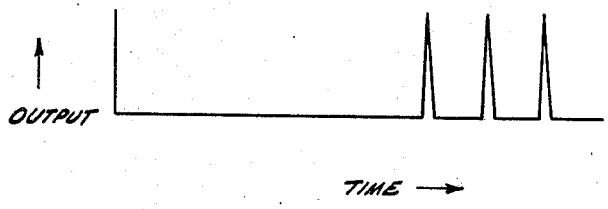
FIG. 5 is a similar schematic representation showing the output of the maser material of FIG. 1 when it has reached the threshold for stimulated emission.

This actual operation is shown schematically in FIGS. 2 to 5. FIG. 1 shows the output of the pulse generator 9 with time, as it is made to pulse in a cyclic manner with a time interval between pulses which is substantially less than the fluorescent relaxation time for the maser material, such as pink ruby 16. The corresponding output of the flash tube 14 also is a train of pulses as shown in FIG. 3. The quantum state of the pink ruby 16 undergoes a sharp rise after each excitation pulse and a small loss during the interpulse period due to fluorescent decay, as shown in FIG. 4. The stimulated emission of energy commences after the sixth pulse, after the pink ruby has stepwise reached the threshold for stimulated emission, as shown in FIGS. 4 and 5.

Obviously many other modifications and variations of the present invention are possible in the light of the above teachings. It is therefore to be understood that within the scope of the appended claims the invention can be practised otherwise than as specifically described.

What is claimed is:

1. A method of operating an optical maser which consists of the steps of generating a series of pulses of electrical energy with a time interval between pulses which is substantially less than the fluorescent relaxation time of the maser material of the aptical maser, applying the series of pulses of electrical energy to a single light pump cooperatively associated with the optical maser material to generate a series of pumping light pulses of insufficient energy to elevate the maser material to the threshold for stimulated emission having a time interval between pulses which is substantially less than the fluorescent relaxation time of the maser material, and applying the pulses of light energy to the maser material until the maser material is pumped stepwise to the excitation level for stimulated emission of coherent light.

2. A method of operating an optical maser which consists of the steps of continuously generating a series of pulses of electrical energy with a time interval between pulses which is substantially less than the fluorescent relaxation time of the maser material of the optical maser, continuously applying the series of pulses of electrical energy to a single light pump cooperatively associated with the optical maser material to generate a series of pumping light pulses of insufficient energy to elevate the maser material to the threshold for stimulated emission having a time interval between pulses which is substantially less than the fluorescent relaxation time of the maser material, and continuously applying the pulses of light energy to the maser material to pump the maser material stepwise to the excitation level for stimulated emission and to produce a series of pulses of coherent light therefrom corresponding to the series of pumping light pulses.

3. A system for the production of repetitive pulses of coherent light which consists of a body of maser material at thermal equilibrium level, a pulse generator for generating a series of pulses of electrical energy with a time interval between pulses which is substantially less than the fluorescent relaxation time of the maser material, and a single flash tube connected to the pulse generator for energization by the pulses of electrical energy and production of a series of pumping light pulses of insufficient energy to elevate said maser material to the threshold for stimulated emission having a time interval between pulses which is substantially less than the fluorescent relaxation time of said maser material, said flash tube being cooperatively associated with said maser material for continuously applying the pulses of light energy to the maser material for pumping said maser material to the threshold for stimulated emission by stepwise elevation of the quantum state thereof and continuously producing a series of pulses of coherent light therefrom corresponding to the series of pumping light pulses.

References Cited by the Examiner

Maiman: "Stimulated Optical Emission in Fluorescent Solids, I. Theoretical Consideration," Physical Review, August 15, 1961, vol. 123, No. 4, pages 1145 to 1148 relied on.

Maiman et al.: "Stimulated Optical Emission in Fluorescent Solids, II. Spectroscopy and Stimulated Emission Ruby," Physical Review, Aug. 15, 1961, vol. 123, No. 4, pages 1152 to 1154 relied on.

Stitch et al.: "Optical Ranging System Uses Laser Transmitter," Electronics, vol. 34, No. 16, April 21, 1961, pp. 51–53.

Stitch et al.: "Repetitive Hair-Trigger Mode of Optical Maser Operation," Proc. of the IRE, October 1961, vol. 49, No. 10, pages 1571 and 1572.

Vogel et al.: "Lasers: Devices and Systems-Part III," Electronics, vol. No. 45, Nov. 10, 1961, pages 83 and 84.

JEWELL H. PEDERSEN, *Primary Examiner.*